L. H. KAISER.
WHEELING SERVICE CART.
APPLICATION FILED OCT. 16, 1919.

1,396,713.

Patented Nov. 8, 1921.
2 SHEETS—SHEET 1.

Witness
James E. Alden.

Inventor:
Louis H. Kaiser,
By Wood & Wood
Attorneys

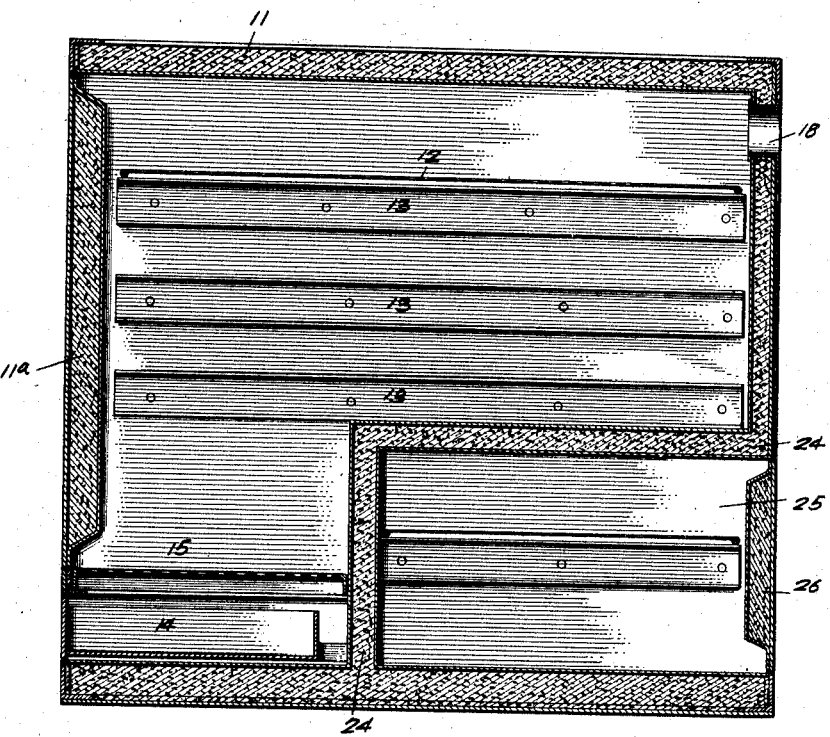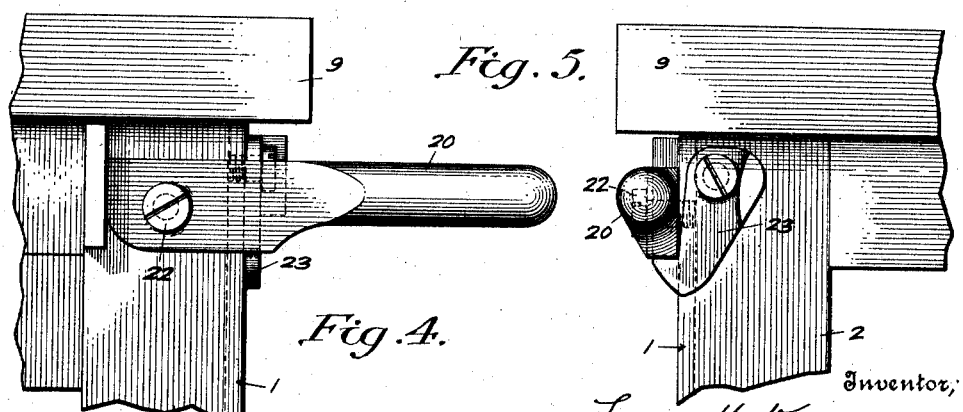

UNITED STATES PATENT OFFICE.

LOUIS H. KAISER, OF CINCINNATI, OHIO, ASSIGNOR TO THE JOHN VAN RANGE COMPANY, OF CINCINNATI, OHIO, A CORPORATION OF OHIO.

WHEELING SERVICE-CART.

1,396,713.  Specification of Letters Patent.  Patented Nov. 8, 1921.

Application filed October 16, 1919. Serial No. 331,074.

*To all whom it may concern:*

Be it known that I, LOUIS H. KAISER, a citizen of the United States, and residing at Cincinnati, in the county of Hamilton and State of Ohio, have invented a new and useful Improvement in Wheeling Service-Carts, of which the following specification is a full disclosure.

This invention relates to tea-carts, service-trucks, and the like, and has for its object to provide a combination cart and dining-table, so constructed as to allow room beneath the same for the knees of the person or persons seated thereat, and to provide a hermetically sealed food delivery and storage compartment, formed as an integral part of said cart.

Heretofore, in devices of this class, no provision has been made for seating persons, at the cart, and the advantage of so doing will be readily apparent, in its use for individual service in hotels and hospitals.

In the case of a hospital patient, in a rolling-chair, or the like, this cart may be placed in juxta-position to the patient in such manner as to allow for the use of the cart as a dining-table.

The device is simple in construction, durable, and is of low cost to manufacture.

Other objects will appear in the description of the drawings, which form a part of this specification, and in the appended claim.

Fig. 3 is a central vertical section through the compartment casing of a modified structure, illustrating separate hot and cold compartments.

Fig. 4 is an enlarged side elevation of a portion of the upper end of the cart, illustrating the guiding or wheeling handle set in position for use.

Fig. 5 is an end elevation of the parts shown in Fig. 4.

Figure 1:
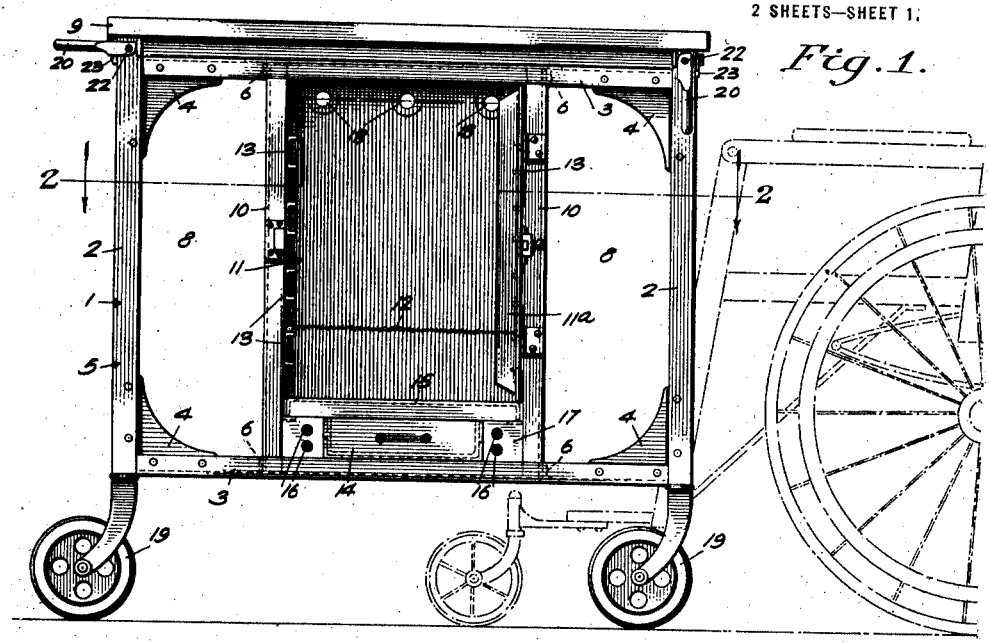
Figure 1 is a side elevation of the cart, the door of the food compartment being shown in open position, and a portion of a rolling-chair being shown in dot and dash lines positioned for use thereat.
Figure 2:
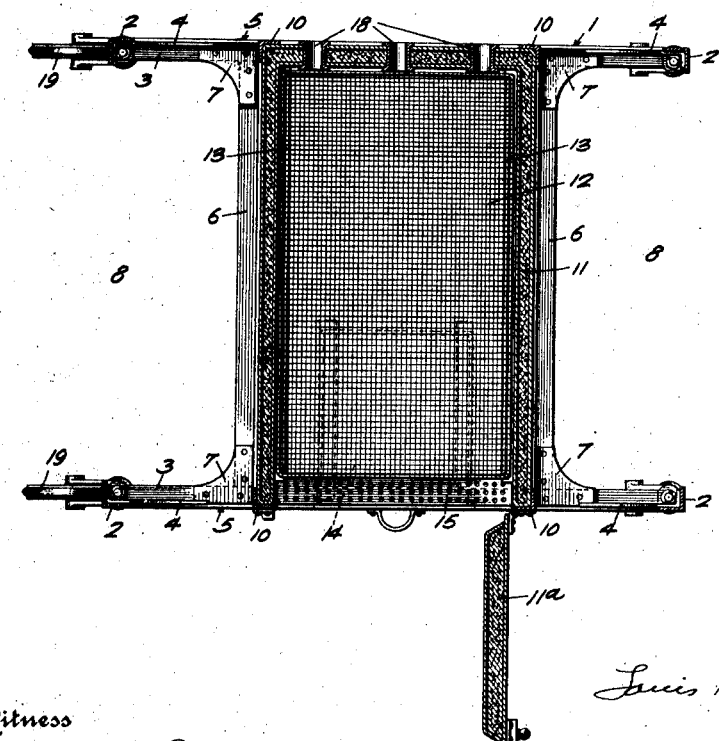
Fig. 2 is a horizontal sectional view on the line 2—2, of Fig. 1.

The frame 1 of the cart is constructed of angle-iron, and is composed of vertical corner posts 2, two of the posts at each side being connected, at the top and bottom, by cross-irons 3, suitably fastened together by brackets 4, to form side frames, generally designated at 5. These side frames are in turn connected together by cross-braces 6 and brackets 7, at the top and bottom, to form a rigid cart body or frame structure. The relation of the cross-braces 6 to the ends of the side frames is such, that spaces 8 are formed, to allow for the use of the cart as a dining-table, as above described. The cart is provided with a top 9 to be used as a table. Centrally located between the cross-braces 6, and held in rigid position by vertically disposed angle-irons 10, is a double-walled warming-oven 11, of rectangular configuration, provided with a double-walled door 11$^a$ the whole being designed to contain and maintain in warmed condition, such food as may be placed therein. The oven is further provided with horizontally disposed foraminous shelves 12, (one only having been shown), supported upon ledges 13; and at its bottom portion is provided with a heating element 14, shown as a drawer or charcoal container. A perforated sheet-iron cover 15 is disposed above the drawer, for a purpose hereinafter described.

Draft openings 16 are provided in the wall 17, surrounding the drawer 14, and vent openings are indicated at 18, through the upper part of the rear wall of the oven 11.

The corner posts 2 are provided at their lower ends with suitable swiveled rollers or casters 19.

In the use of my tea-cart or service-truck, the drawer 14, with its glowing charcoal is placed within the oven, the heat passing through the perforations of the cover 15 to the oven space above.

At the opposite sides and at each end of the cart, immediately below the top board or table 9, I provide guiding or wheeling handles 20. Each handle 20 is secured and pivoted upon its respective vertical post 2, by a screw 22. The handle is held in its operative position, projecting horizontally from the post, by a weighted catch 23, pivoted to the post 2 at right angles to the pivot of the handle. The hook end of the catch engages the lower edge of the handle, securely holding the handle in its horizontal position, and when the catch is released the handle swings downwardly to a vertical position out of the way.

In the modified form of compartment casing, shown in Fig. 3, the casing interior is sub-divided by the insulated partition wall 24, forming a cold compartment 25, having an entrance opening through the rear wall of the casing and closure door 26. The heated compartment or oven is substantially as heretofore described.

Having described my invention, I claim:

A wheeling service-cart comprising a pair of angle-iron side frames, having wheels at the opposite base ends, a table fixed to the top of said side frames, a compartment casing mounted centrally between the side frames below the table and of a width dimension less than said side frames, and with said side frames forming open areas at opposite sides of said casing, said compartment casing interiorly sub-divided to provide a heated compartment having an entrance opening through one side of the casing, and a cold compartment opening through an opposite side of the casing, and a heater for said heated compartment.

In witness whereof, I hereunto subscribe my name, as attested by the two subscribing witnesses.

LOUIS H. KAISER.

Witnesses:
L. A. BECK,
M. S. BARRON.